June 23, 1970  N. L. WILLMANN ET AL  3,516,863
BATTERY PLATE STRUCTURE
Filed Jan. 22, 1968  2 Sheets-Sheet 1
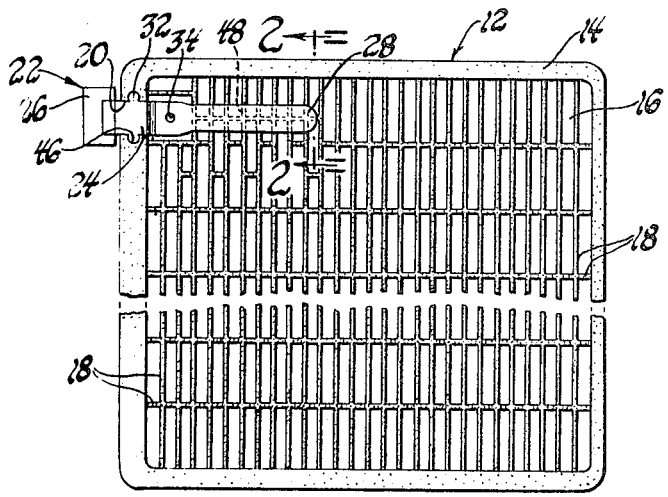
Fig. 1
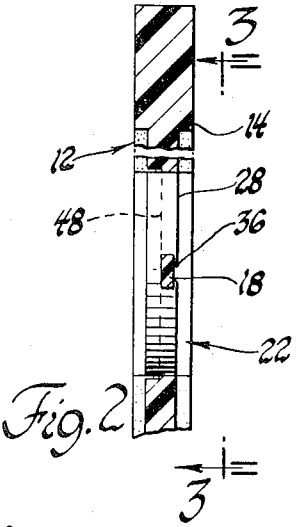
Fig. 2
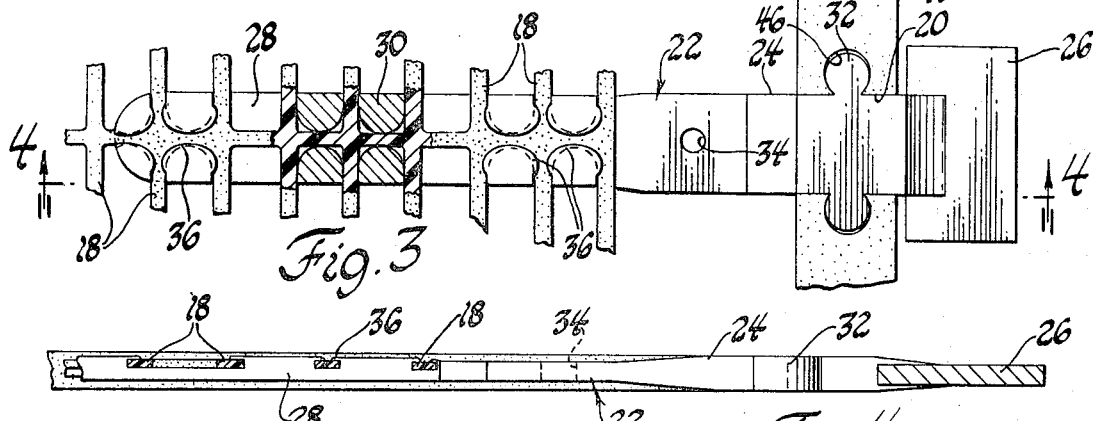
Fig. 3
Fig. 4
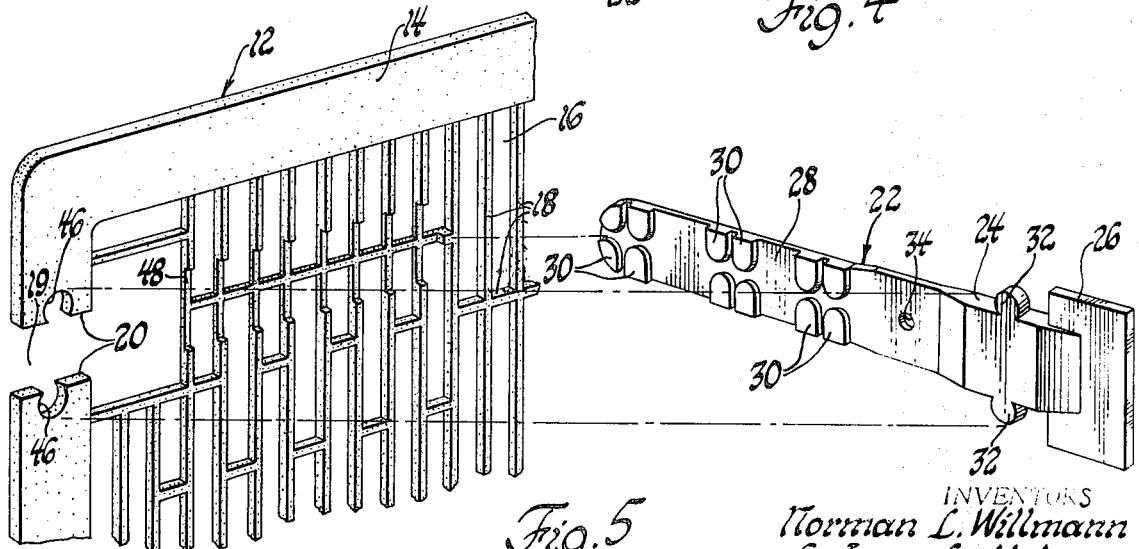
Fig. 5
INVENTORS
Norman L. Willmann
& Jerry L. Helms
Laurence B. Plant
ATTORNEY

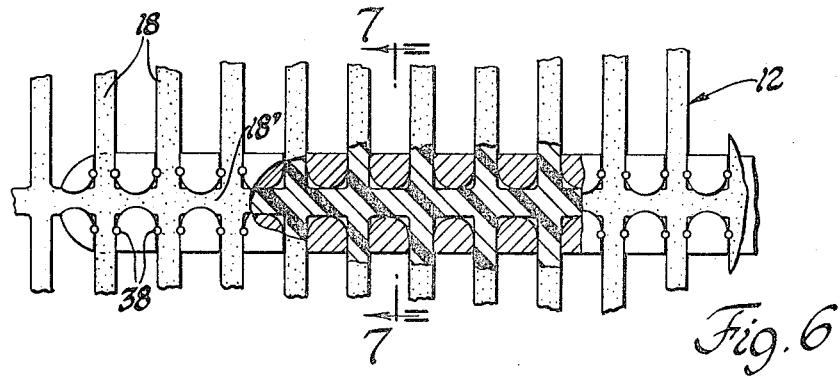
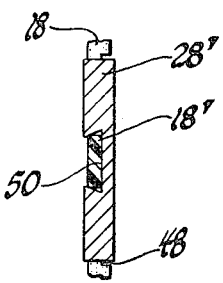
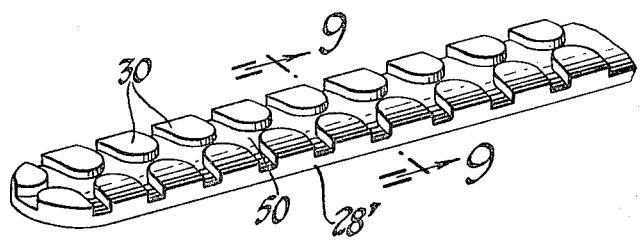
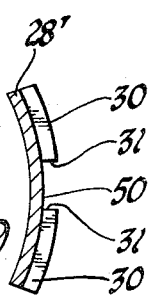
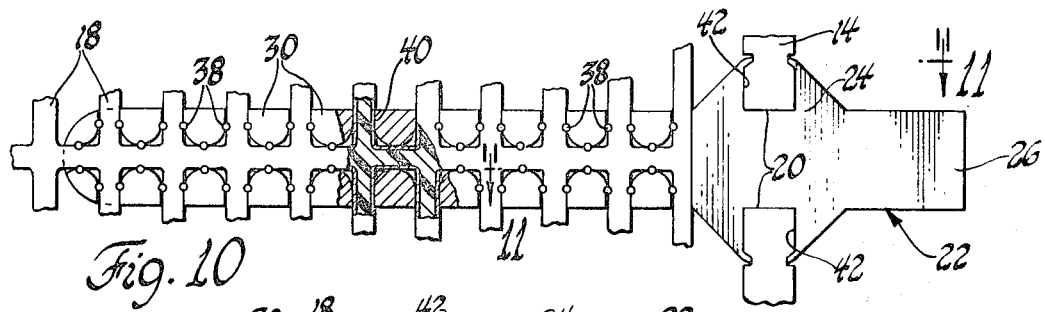
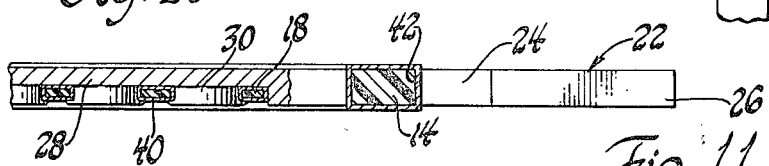
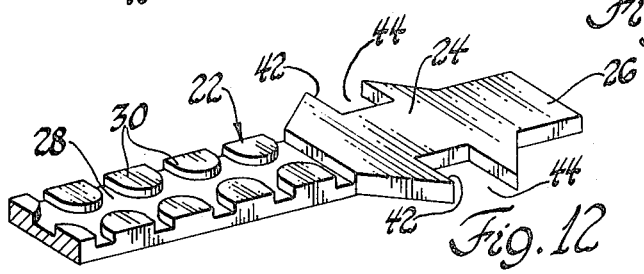

United States Patent Office 3,516,863
Patented June 23, 1970

3,516,863
BATTERY PLATE STRUCTURE
Norman L. Willmann, Anderson, and Jerry L. Helms,
Muncie, Ind., assignors to General Motors Corporation,
Detroit, Mich., a corporation of Delaware
Filed Jan. 22, 1968, Ser. No. 699,395
Int. Cl. H01m 35/04
U.S. Cl. 136—58
7 Claims

ABSTRACT OF THE DISCLOSURE

A lightweight, nonconductive battery plate grid and terminal structure therefor. The grid comprises principally a grid body and a grid border. The grid border is discontinuous to the extent that it has a slot formed therein. The slot boundaries are mechanically interlocked with the head portion of a terminal structure by means of complementary cooperating members in the slot and on the head. The terminal structure preferably has an extension such as a stem portion which extends into and mates with the grid body. A groove or slot may be formed in the grid body to assist in the mating of the stem or extension with the grid body. The grid is preferably coated with a conductive material prior to pasting with active material.

---

In recent years there has been a trend toward producing lighter batteries. A convenient way to do this is by reducing the weight of such elements as the case, top, grids, connectors, etc. Lightweight grids of plastic or the like are therefore becoming more commercially important. Until recently, the normal practice has been to cast an integral grid and conductive terminal lug from lead or lead-alloys. However, with the advent of plastic grids has come the requirement for developing techniques for attaching conductive terminal elements to the plastic grids in a manner such that they will not come loose during subsequent handling and/or during service. Additionally, the terminals should be attached in a manner which will not weaken the grid and in a manner which affords the most surface area of contact between the terminal and the active material of the plate.

This invention deals with improved lightweight nonconductive battery grids and terminal connectors therefor. It is an object of this invention to provide an improved and strengthened connection between a nonconductive battery grid and a conductive terminal therefor. It is another object of this invention to provide a terminal connection to a nonconductive battery grid which connection readily permits the flush pasting of the grid. It is a further object of this invention to provide complementary mating means between a slotted grid border and a terminal, which means strengthens the grid at the slotted border, especially with respect to forces which are applied in planes which are substantially parallel to the principal plane of the grid. It is a still further object of this invention to provide an increased surface area of contact between the terminal, the grid and the active material. These and other objects and benefits will more clearly be brought to light by the detailed description of our invention, which follows.

According to this invention there is provided a battery grid having a discontinuous border. The discontinuous border has at least two ends opposing each other such as to effectively define a slot in the border. A conductive terminal member having a head portion, a lug portion and preferably a stem portion is located within the slot. The lug portion extends outwardly from the grid and serves as the external electrical contact for the plate. The head portion has means for mating with the grid border ends in a manner which increases the processing and handling strength of the grid. In one embodiment of the invention, the terminal head has male projections which mate with undercut complementary female openings in the grid border ends. In another embodiment, the head portion has opposing slots formed therein for receiving and retaining the grid border ends. In this latter embodiment, the border ends fit into the slots in the head and the open ends of the slots are deformed into a gripping or biting engagement with the border. A preferred form of the invention includes the use of a head extension or stem portion on the terminal. The stem portion may be of the type disclosed and claimed in copending United States patent application Ser. No. 684,151, filed Nov. 20, 1967. The extension, stem or the like provides a better current path to the terminal. The extension is preferably interlocked with the grid body. In one form of the invention a groove is formed in the grid wires which groove receives and retains the stem portion. Projections on the stem are integrated with the groove-forming grid wires and deformed thereabout.

FIG. 1 is a plan view of one embodiment of the battery grid and terminal structure of this invention.

FIG. 2 is an enlarged sectional view taken along the section line 2—2 of FIG. 1.

FIG. 3 is a partially sectioned view taken along section line 3—3 of FIG. 2.

FIG. 4 is an enlarged fragmentary view of the grid and terminal construction taken along the line 4—4 of FIG. 3.

FIG. 5 is a perspective view of the relationship which exists between the terminal and grid members of this invention before assembly.

FIG. 6 is an enlarged partially sectioned plan view depicting another aspect of this invention.

FIG. 7 is a sectioned end view taken along the lines 7—7 of FIG. 6.

FIG. 8 is a perspective view of a stem portion of the terminal member of FIG. 6.

FIG. 9 is a sectioned end view along the lines 9—9 of FIG. 8.

FIG. 10 is an enlarged partially sectioned plan view of another embodiment of this invention.

FIG. 11 is a side sectional view taken along the line 11—11 of FIG. 10.

FIG. 12 is a perspective view of the terminal member of FIG. 10.

With respect to FIGS. 1-5, there is depicted a nonconductive grid 12 having a grid border 14 and a grid body 16. Such a grid is preferably comprised of polypropylene though other plastics may also conveniently be used. The grid body 16 has a plurality of openings therein. Preferably, these openings result from the provision of a plurality of intersecting grid wires 18 which comprise the solid portion of the grid body 16. A terminal member 22 is shown in its preferred location with respect to the grid 12. FIG. 5 shows the grid and terminal therefor in perspective and in their preassembled condition. As best shown in FIG. 5, the border 14 has a slot 19 therein. The slot 19 is effectively defined by the opposing border ends 20. Undercut female openings 46 are formed beneath the surfaces of the respective opposing ends 20 to complement and mate with male projections 32 extending from the head portion 24 of the terminal 22. In this particular embodiment, the male projections 32 and the complementary female openings 46 are generally circular. However, other shapes such as triangles, wedges, or the like would also be acceptable. The terminal member itself comprises a lug portion 26, a head portion 24 and preferably a head extension such as stem 28. The lug portion 26 may be merely an extension of the head portion 24 or an enlarged portion, as shown in FIG. 5. The head portion 24 has a thickness approximately equal to the thickness of the border 14 and a width approximately equal to the width of the slot 19. The head portion 24 conveniently fits into and substantially fills the slot 19. At the same time, the projections 32 and the complementary mating female openings 46 in the border ends 20 coact to produce a joint between the head portion and the border ends. When used, the stem portion 28 is preferably thinner than the head portion 24 and the border 14 as best shown in FIG. 4. This is particularly the case where the grid is to be flush pasted with respect to the border.

In a preferred embodiment (FIGS. 1–5) the terminal 22 has a stem portion 28 which extends into the grid body and is interlocked therewith by means of deformable upstanding projections or rivet-like fasteners 30. The stem 28 preferably fits within a groove 48 which is formed in the grid body 16. The groove can be formed by milling out portions of the intersecting grid wires 18. The upstanding rivet-like fasteners 30 are so spaced, both longitudinally and laterally, as to lie between those portions of the grid wires 18 which form the bottom of the groove 48. The fasteners 30 effectively straddle the grid wires and are subsequently deformed thereabout. A portion of a post-assembled terminal and grid is best shown in FIG. 3. The fasteners 30 are deformed into interlocking engagement with the grid wires 18. The deformation which effects the interlocking can be accomplished by simply flattening the fastener 30. In such a case, a cap such as 36 is formed during the flattening which spreads over the adjacent grid wires. A registration hole 34 is used to aid in properly positioning the terminal in the assembly machine. Other forms of mechanical deformation, such as staking or the like may also be used.

When using a stem such as 28, it is generally unnecessary to mechanically deform the male projections 32 in order for them to serve their intended function. That is to say, the projections 32 and the complementary mating female openings 46 still provide the required strength without the requirement for deforming the projections 32. However, should it be desired to use merely the head portion 24 in combination with some other form of terminal extension into the battery paste, mechanical deformation of the projections 32 is desirable to insure that the head portion 24 does not become disengaged from the slot 19. Hence, in some instance it is desirable to deform the projections 32 into interlocking engagement with the border end openings 46. As with the projections 30, flattening or staking techniques can be used.

FIGS. 10–12 depict another embodiment of the invention. FIG. 12 shows a perspective view of a terminal 22 having a lug portion 26, a head portion 24, and a stem portion 28. In this embodiment, the lug portion 26 is a simple extension of the head portion 24. In this embodiment, the head portion 24 has two opposing slots 42 formed therein. These slots are of an appropriate size and shape to accommodate the placement of the grid border ends 20 therein when the head portion 24 is fitted into the slot 19. The grid border ends 20 fit within the slots 42 and the open ends 44 of the slots 42 are crimped together so as to bite into the grid border 14. Clearly, different complementary shapes may be formed into the border ends 20 and the slots 42 as has been shown and discussed with respect to FIGS. 1–5. For flush pasting applications, the thickness of the terminal is preferably less than the thickness of the grid border.

FIGS. 6–9 show a unique improved technique for attaching the stem 28' to the centrally disposed grid wire 18'. The stem 28 is arcuate in shape along its longitudinal axis. The fasteners 30 are formed such that the opposing depending sides 31 thereof are substantially parallel with each other. The upstanding fasteners 30 substantially define a centrally disposed elongated groove 50. When placed in position with respect to the centrally disposed grid wire 18' and caused to be flattened, as by a simple pressing or rolling technique, the initially parallel sides 31 are caused to converge in such a manner as to wrap around and engage the grid wire 18'. Further pressing or rolling improves the interlock even more. Additional staking such as at 38 can also be used, if desired, to produce an even stronger joint between the terminal and the grid.

The plastic grid is formed by any accepted technique for forming such materials. We particularly prefer to punch the grid core from a flat sheet of high strength plastic stock such as polypropylene. The grid wires are then preferably coined to reduce their thickness relative to the grid border. When using a stem of the type described, a groove 48 is preferably milled into the grid body.

A conductive coating 40 can be applied to enhance the conductivity of the grid and thereby reduce the IR drop of the plate. In lead acid batteries this coating is preferably comprised of lead and alloys thereof. The coating is preferably applied by flame spraying, but any acceptable means known to the art may be used. The coating is applied either before or after the terminal has been affixed to the grid. We prefer to deposit the lead coating after the terminal has been affixed to the grid as this insures a tight interlock between the terminal and the grid (not shown). In certain cases, there is no need for a coating. Such would be the case when a conductive active material paste is used such as disclosed and claimed in U.S. Ser. No. 634,990, now Pat. No. 3,466,193 entitled "Storage Battery Positive Plate." filed May 1, 1967 in the name of Thomas J. Hughel and assigned to the assignee of the incident invention.

Coating after the terminal is in place provides the maximum surface area of contact between the terminal member and the conductive coating. This is especially so when using a stem having the improved shaped fasteners 30. These fasteners provide increased coating contacting surfaces. Contra to prior fasteners which had relatively small surface areas and were virtually surrounded by the grid elements with which they were interlocked, the incident fasteners 30 have an enlarged surface area for contact with the paste or coating as appropriate. Straddling of the grid wire by the improved fastener precludes the requirement for surrounding the fastener with grid material which effectively exposes the additional surface area of at least one depending fastener wall for contact with the coating or paste, as appropriate.

When using a coating, it is preferred to roughen the plastic's surface by blasting same with a suitable abrasive material such as 100 mesh $Al_2O_3$ which is directed against the face of the plastic. This increases the adhesion of the coating to the plastic. When coating with lead for lead acid batteries, the lead is sprayed onto the roughened surface to a predetermined thickness of preferably about 0.006″. Thinner coatings of approximately 0.003 to 0.004, however, may be employed.

These grids and terminals are particularly suitable for flush-pasting of the plate with respect to the grid border. By flush-pasting with respect to the grid border is meant that the active material is placed in the grid body portion until it is substantially level with the grid border. For flush-pasting, the combined thickness of the grid body and the terminal stem, at their points of interlocking should be less than the thickness of the grid border. Hence, when flush-pasting with respect to the grid border, the grid body and stem, if used, are completely covered and surrounded by the active material. In accordance with a preferred embodiment of this invention, the battery plates are flush pasted to an overall thickness of about 0.06 inch with the grid body and stem having a thickness of about 0.040 inch. Though clearly over-pasting with respect to the grid border may also be done, the particular embodiments disclosed herein have particular utility and have been designed particularly for use in conjunction with flush-pasted plates. When overpasting is done, it is generally preferred to overpaste to a thickness of about 0.01 inch. When overpasting, there is less need for the groove 48, as stem thickness becomes less significant.

While this invention has been disclosed primarily in terms of specific embodiments thereof, it is not intended that the invention be limited thereto, except as defined by the appended claims which follow.

We claim:

1. A battery plate structure comprising a nonconductive grid supporting an electrode active material, said grid comprising a discontinuous grid border and a grid body, said grid body being situated within said discontinuous grid border, said discontinuous grid border having at least two portions thereof opposing each other and defining an open slot through said border, a conductive terminal connected to said grid providing electrical contact with said active material, said conductive terminal comprising a head portion in said slot, a lug portion, and a stem portion, said head portion and said border portions having first and second mutually complementarily shaped means joined one with the other and securing said head portion to said border portions, said first and second means comprising male projections and female openings respectively, said stem portion extending from said head portion into said grid body and interlocking with said grid body.

2. The battery plate structure of claim 1 wherein said male projections extend outwardly from said head portion, and said second means comprises undercut female openings in said opposing grid border portions.

3. The battery plate structure of claim 1 wherein said female openings are open-ended slots in said head portion.

4. The battery plate structure of claim 3 wherein the open ends of said slots in said head bite into said border.

5. In a battery plate structure comprising the combination of a nonconductive grid supporting an electrode active material and a conductive terminal connected to said grid providing electrical contact with said active material, said grid comprising a grid border and a grid body within said border, said grid border being discontinuous at least to the extent of having at least two ends thereof opposing each other and defining an open slot through said border, said grid body having a first elongated groove formed in one face thereof, a plurality of first grid wires intersecting a second grid wire and providing a linear series of openings coextensive with said first groove, said second grid wire centrally disposed with respect to the longitudinal dimension of said linear series of openings, said conductive terminal comprising a lug portion, a head portion, and a flattened stem portion, said head portion being located within said slot in said border and being mated with said opposing ends of said border, said head portion and said border portion having respectively first and second mutually complementarily shaped means joined one with the other and securing said head portion to said border portion, and said flattened stem portion having fasteners thereon which are spaced along the length of and on at least one side of said stem and define a substantially centrally disposed longitudinally extending second groove on said one side of said stem between said fasteners, said second groove on said stem being mated with said centrally disposed second grid wire by a wrapping action of said projections over said wire resulting from the substantial flattening of said stem during the assembly of said stem and said grid.

6. In a battery plate structure comprising the combination of a nonconductive grid supporting an electrode active material and a conductive terminal connected to said grid to provide electrical contact with said active material, said grid comprising a grid border and a grid body within said border, said grid border being discontinuous at least to the extent of having at least two ends thereof oposing each other and defining an open slot through said border, said grid including a plurality of first grid wires intersecting a second grid wire and providing a linear series of openings, said second grid wire centrally disposed with respect to the longitudinal dimension of said linear series of openings, said terminal comprising a lug portion and a flattened stem portion, said flattened stem portion having fasteners thereon which are spaced along the length of and on at least one side of said stem and define a substantially centrally disposed longitudinally extending groove on said one side of said stem between said fasteners, said groove on said stem being mated with said centrally disposed second grid wire by a wrapping action of said projections over said wire resulting from the substantial flattening of said stem during the assembly of said stem and said grid.

7. In the combination as defined in claim 6 wherein said fasteners are spaced between said first grid wires along said longitudinal dimension of said stem and are mechanically deformed into engagement with said first grid wires.

References Cited
UNITED STATES PATENTS

| 2,694,100 | 11/1954 | Zahn | 136—58 |
| 3,269,863 | 8/1966 | Helms | 136—36 |

WINSTON A. DOUGLAS, Primary Examiner

A. SKAPARS, Assistant Examiner

U.S. Cl. X.R.

136—36; 29—2